US008732203B2

(12) United States Patent
Sergey

(10) Patent No.: US 8,732,203 B2
(45) Date of Patent: May 20, 2014

(54) IMAGE FORMING APPARATUS AND CONTROL METHOD THEREOF

(75) Inventor: Sobko Sergey, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 14 days.

(21) Appl. No.: 13/445,960

(22) Filed: Apr. 13, 2012

(65) Prior Publication Data

US 2012/0194866 A1 Aug. 2, 2012

Related U.S. Application Data

(62) Division of application No. 11/325,484, filed on Jan. 5, 2006, now Pat. No. 8,180,797.

(30) Foreign Application Priority Data

Jan. 7, 2005 (KR) ........................ 10-2005-0001748

(51) Int. Cl.
*G06F 17/30* (2006.01)

(52) U.S. Cl.
CPC ..................................... *G06F 17/30* (2013.01)
USPC ........... 707/791; 707/713; 707/722; 707/802; 707/822; 707/828

(58) Field of Classification Search
USPC ................................................ 707/600–899
See application file for complete search history.

(56) References Cited

U.S. PATENT DOCUMENTS 7,725,490 B2* 5/2010 Hitchen et al. ................ 707/783
2003/0226015 A1* 12/2003 Neufeld et al. ............... 713/166

FOREIGN PATENT DOCUMENTS

| CN | 1256494 | 6/2000 |
| JP | 4-322378 | 11/1992 |
| JP | 2002-149371 | 5/2002 |
| JP | 2004-30404 | 1/2004 |
| JP | 2004-147218 | 5/2004 |
| KR | 1998-81791 | 11/1998 |
| KR | 2003-93417 | 12/2003 |
| KR | 2004-65930 | 7/2004 |

OTHER PUBLICATIONS

Korean Office Action dated May 24, 2006 issued in KR 2005-1748.
Chinese Office Action dated Sep. 21, 2007 issued in CN 2006100036422.
Chinese Office Action dated Jul. 4, 2008 issued in CN 2006-10003642.2.

* cited by examiner

*Primary Examiner* — Isaac M Woo
(74) *Attorney, Agent, or Firm* — Stanzione & Kim, LLP

(57) ABSTRACT

An image forming apparatus includes a first storage medium to store a storage target file, without storing storage management information of the storage target filed. The image forming apparatus may also have a controller to control storing the storage management information of the storage target file separately from the storage target file. Therefore, without the storage management information that is indispensable for accessing the storage target file the file is secure regardless of detaching the first storage medium from the image forming apparatus.

10 Claims, 3 Drawing Sheets

IMAGE FORMING APPARATUS AND CONTROL METHOD THEREOF

CROSS-REFERENCE TO RELATED APPLICATIONS

This application is a divisional application of prior application Ser. No. 11/325,484 filed on Jan. 5, 2006 in the United States Patent and Trademark Office, which claims the benefit under 35 U.S.C. §119 from Korean Patent Application No. 2005-1748, filed on Jan. 7, 2005, the entire content of which is incorporated herein by reference.

BACKGROUND OF THE INVENTION

1. Field of the Invention

The present general inventive concept relates to an image forming apparatus, and a control method thereof, and more particularly, to an image forming apparatus, and a control method thereof in which a mass storage medium is detachable.

2. Description of the Related Art

An image forming apparatus is an apparatus that forms an image corresponding to input image data, on a recording medium, such as a printing paper. A printer, a facsimile, and a copier are examples of image forming apparatuses. Further, the image forming apparatus is connected to a host apparatus and can perform various types of data exchange and information exchange with the host apparatus.

On the other hand, as semiconductor and data compression technologies have recently been developed to satisfy users' demands, the image forming apparatus is provided with a mass storage medium. The mass storage medium can be used as a storage medium of the host apparatus that is connected to the image forming apparatus. Generally, a hard disk drive (HDD) is used as the mass storage medium.

Generally, the mass storage medium can be attached to and detached from the image forming apparatus. Conventionally, various types of files are stored in the mass storage medium attached to the image forming apparatus, and the mass storage medium can be detached and can be attached or mounted to other image forming apparatuses. Therefore, the various types of files stored in the mass storage medium can be used in more than one image forming apparatus.

However, the various types of files stored in the mass storage medium can be shared by many people, and a problem arises when files require secure access or when files contain images that only can be formed by a designated (i.e. authorized) image forming apparatus. The files requiring secure access and the files containing images that can be only formed by the designated image forming apparatus may be exposed to other persons easily when a mass storage medium that stores the files is detached and mounted on other image forming apparatuses.

SUMMARY OF THE INVENTION

The present general inventive concept provides an image forming apparatus and a control method thereof to store a storage target file requiring security separately from a storage management information of the storage target file. Although the storage target file is stored in a mass storage medium detachable from the image forming apparatus, the storage management information is stored separately in a non-volatile memory fixed in the image forming apparatus.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a first storage medium to store a storage target file without storing storage management information of the storage target file.

The image forming apparatus may further include a controller to control storing the storage target file in the first storage medium, and not storing the management information of the storage target file in the first storage medium.

The controller may include a second storage medium to store the storage management information of the storage target file, and a file system management unit to enable storing the storage management information of the storage target file in the second storage medium.

The image forming apparatus may further include an input unit to input a separate storage confirmation command for the storage target file, wherein the file system management unit enables storing the storage target file in the first storage medium, and enables storing the storage management information in the second storage medium, when storing the storage target file based on the separate storage confirmation command.

The image forming apparatus may further include an interface unit through which a confirmation request signal for separate storage for the storage target file is transmitted from a host apparatus, wherein the file system management unit enables the storage target file to be stored in the first storage medium, and enables the storage management information to be stored in the second storage medium when storing the storage target file based on the confirmation request signal for separate storage.

The foregoing and/or other aspects of the present general inventive concept are also achieved by providing a control method of an image forming apparatus having a detachable first storage medium and a fixed second storage medium. The method includes storing the storage target file in the detachable first storage medium, and storing storage management information of the storage target file in the fixed second storage medium.

The storing of the storage management information may further include storing the storage management information in the fixed second storage medium, when a separate storage confirmation command for the storage target file is input.

The storing of the storage management information may further comprise storing the storage management information in the fixed second storage medium, when a confirmation request signal for separate storage for the storage target file is transmitted from a host apparatus.

The foregoing and/or other aspects of the present general inventive concept are also achieved by providing an image forming apparatus including a plurality of data storage units, and a controller to control storage of a target file in a first data storage unit of the plurality of data storage units, and to control storage of management information corresponding to the target file in one of the plurality of data storage units according to a security class of the target file.

The foregoing and/or other aspects of the present general inventive concept are also achieved by providing a computer readable storage medium having executable codes to perform a method of controlling an image forming apparatus, the method including storing a target file in a first data storage unit that is detachable from the image forming apparatus, determining whether storage information indispensable for reading the target file is to be stored in the first data storage unit or in a second data storage unit that is fixed in the image forming apparatus, and storing the storage information in one of the first data storage unit and second data storage unit according to the determination.

The foregoing and/or other aspects of the present general inventive concept are also achieved by providing an image forming apparatus including a removable hard disk drive to store a file, and a non-volatile memory to store access information used to access the file such that the file is not accessible when the hard disk drive is removed from the image forming apparatus.

The foregoing and/or other aspects of the present general inventive concept are also achieved by providing a file management unit including a plurality of data storage units including at least one data storage unit that is non-removable, and a control system to store access information for a file stored in any of the plurality of data storage units in the at least one non-removable data storage unit.

The foregoing and/or other aspects of the present general inventive concept are also achieved by providing a method of secure storage of a file in a detachable data storage unit of an image forming apparatus, the method including storing indispensable information for accessing the file stored in the detachable data storage unit in a non-volatile memory fixed in the image forming apparatus.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
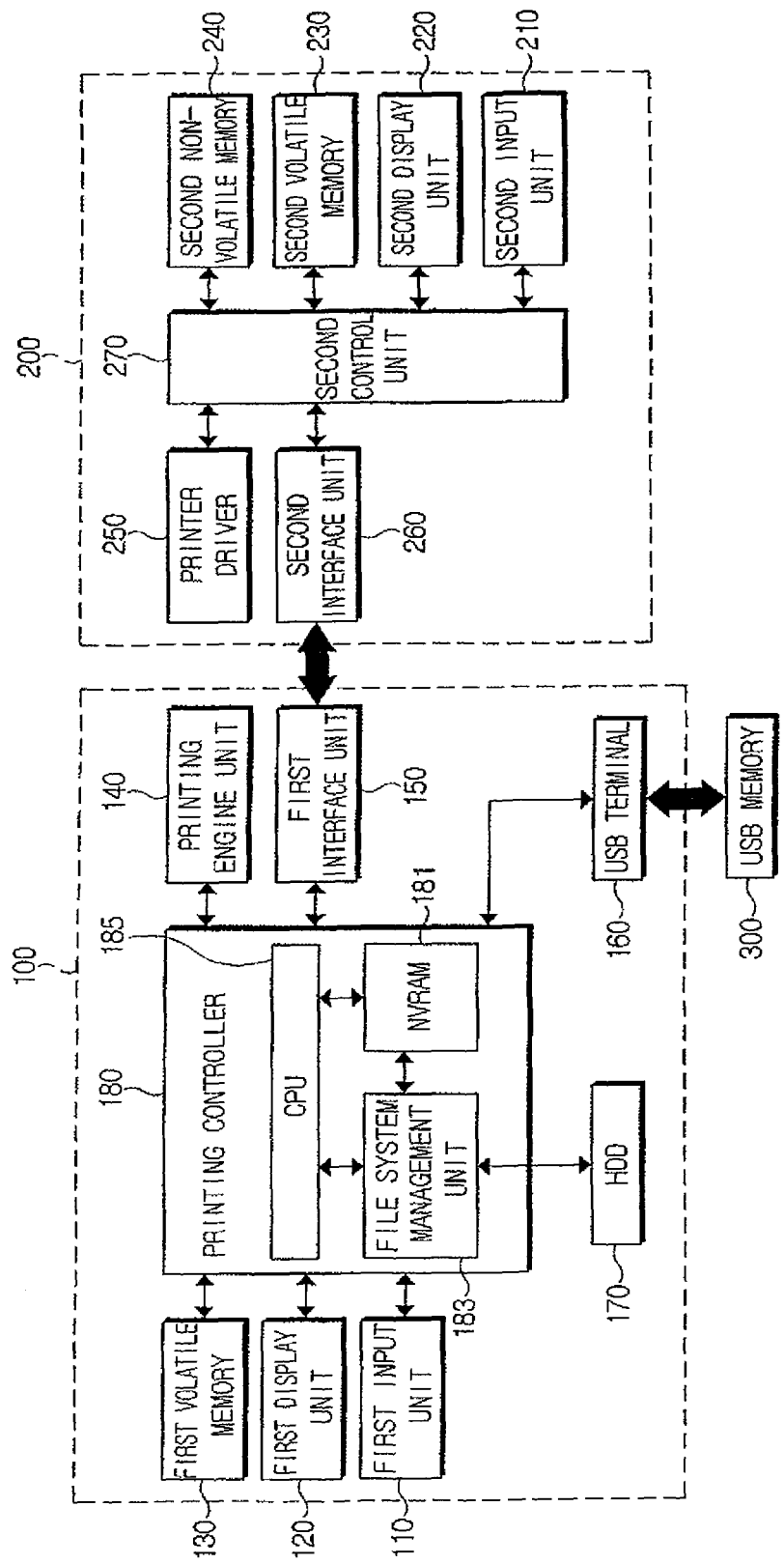
FIG. 1 is a block diagram illustrating a printer and a host apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

In the following description, for the convenience of explanation, a printer is described as an image forming apparatus, but the scope of the present general inventive concept is not intended to be limited to the printer, and may be applied to other image forming apparatuses. FIG. 1 is a block diagram illustrating a printer 100 and a host apparatus 200 according to an embodiment of the present general inventive concept.

In FIG. 1, the printer 100, the host apparatus 200 and a USB (Universal Serial Bus) memory 300 are illustrated. Here, the host apparatus 200 may be an information processing apparatus, such as a desktop personal computer (PC), a portable PC, and a personal digital assistant (PDA).

Further, the USB memory 300 is one example of a portable storage medium. However, it should be understood that the present general inventive concept is not intended to be limited to the USB memory 300 and may include other type of portable storage memories. According to the present embodiment, various files may be stored in the USB memory 300.

The various files may be read from the USB memory 300, and stored in a HDD 170 of the printer 100.

After a task is executed by an application program in the host apparatus 200, the various files to be printed through the printer 100 may be transmitted from the host apparatus 200 and may be stored in the HDD 170 of the printer 100.

Any of the various files read from the USB memory 300 and the various files transmitted from the host apparatus 200 may then be referred to as a storage target file.

As illustrated in FIG. 1, the printer 100 comprises a first input unit 110, a first display unit 120, a first volatile memory 130, a printing engine unit 140, a first interface unit 150, a USB terminal 160, the HDD 170, and a printing controller 180. Further, the printing controller 180 may include a Non-Volatile Random Access Memory (NVRAM) 181, a file system management unit 183, and a CPU 185. Here, the NVRAM 181 is one example of a non-volatile memory, but it should be understood that the present general inventive concept is not limited to the NVRAM, and other non-volatile memories may also be used.

In the present embodiment, when the various files of different types are stored in the HDD 170 according to a predetermined file system, information of the predetermined file system used to manage the stored various files is referred to as storage management information.

The first input unit 110 has at least one operation button to enable a user to input various user commands. A signal corresponding to a user command input through the first input unit 110 is provided to the CPU 185, and the CPU 185 controls the printer 100 according to the signal corresponding to the input user command.

A storage command for a storage target file may be input through the first input unit 110. The storage command for the storage target file includes an uploading command for various files stored in the USB memory 300 to be read therefrom, and to upload the read various files.

Further, a separate storage confirmation command may be input through the first input unit 110. The separate storage confirmation command is a user command to request a separate storage of the storage target file and the storage management information of the storage target file. In other words, the separate storage confirmation command is a user command to request that the storage target file be stored in the HDD 170, and that the storage management information for the storage target file be stored in the NVRAM 181, respectively. The separate storage confirmation command may be input based on a separate storage confirmation message of the storage management information displayed on the first display unit 120. Here, the separate storage confirmation message of the storage management information may be a message to enable a user to select whether the storage management information of the storage target file is stored in the NVRAM 181 or in the HDD 170, when the storage target file is stored in the HDD 170. For example, if the storage management information of the storage target file is to be stored in the NVRAM 181, a 'Yes' option may be selected on the separate storage confirmation message.

Further, an integral storage confirmation command may be input through the first input unit 110. Here, the integral storage confirmation command is a user command to request that the storage management information and the storage target file be stored in same storage unit (i.e. the HDD 170). In other words, the integral storage confirmation command is a user command to request that the storage management information and the storage target file be stored at a predetermined region of the HDD 170, respectively. The integral storage confirmation command may be input based on the separate storage confirmation message of the storage management information displayed on the first display unit 120. For example, if the storage management information of the storage target file is to be stored in the HDD 170, a 'No' option may be selected on the separate storage confirmation message.

The CPU 185 can control the first display unit 120 to display a message corresponding to a user command or various types of user notice messages.

The separate storage confirmation message of the storage management information may be displayed on the first display unit 120. The CPU 185 can control the first volatile memory 130 to store data generated while the printer 100 is operating. The CPU 185 can control printing engine unit 140 to perform a printing task for a printing target document. That is, the printing engine unit 140 can perform the printing operation by using a recording agent stored in a storage unit (not shown), such as a toner cartridge and/or an ink cartridge.

The first interface unit 150 is an interface that enables communication between the host apparatus 200 and the printer 100. The first interface unit 150 may be a wired connection or wireless connection. A request signal for a separate storage and a request signal for an integral storage may be transmitted from the host apparatus 200 through the first interface unit 150 according to the present embodiment.

The USB terminal 160 is an interface that is connected to the USB memory 300 that is used as a data storage unit to store and/or supply the storage target file.

The CPU 185 can control the HDD 170 to store the storage target file. The HDD 170 is an example of a mass storage medium, but it should be understood that the present general inventive concept is not limited to the HDD, and other mass storage media may also be used.

On the other hand, storage of various files in the HDD 170 can be performed according to the predetermined file system. Here, the predetermined file system may include the storage management information for a collection of files. The storage management information may include a directory, determination of a storage position, necessary information for a file access, a mapping of file names, file numbers, and sequence information of data blocks of a stored file.

Further, the HDD 170 can be divided into a first storage region of various files, and a second storage region to store storage management information corresponding to each file. The various files can be stored in the first storage region, and the storage management information corresponding to each file can be stored in the second storage region.

The NVRAM 181 can store a first control program to control an overall operation of the printer 100. Further, the storage management information of the storage target file can be stored in the NVRAM 181 according to the present embodiment.

The file system management unit 183 manages storage of the various files including the storage target file in the HDD 170. That is, the file system management unit 183 can generate the storage management information such as the storage position, when the storage target file is stored in the HDD 170.

The CPU 185 can control the file system management unit 183 to store the storage target file in the HDD 170, and the storage management information corresponding to the storage target file in the NVRAM 181, when storing the storage target file in the HDD 170.

Further, the CPU 185 can control the file system management unit 183 to store the storage management information and the storage target file in the HDD 170.

The CPU 185 can control the overall operation of the printer 100 according to the first control program stored in the NVRAM 181.

The CPU 185 can enable the first display unit 120 to display the separate storage confirmation message of the storage management information, when the storage command to store the storage target file is input through the first input unit 110.

When the uploading command is input through the first input unit 110, the CPU 185 can control access to the USB memory 300 to read the files stored in the USB memory 300, and to upload the read files to the HDD 170 (i.e., transfer the files stored in the USB memory 300 to the HDD 170).

The CPU 185 can control the file system management unit 183 to store the storage target file in the HDD 170, and to store the storage management information in NVRAM 181, respectively, when the separate storage confirmation command is input through the first input unit 110.

The CPU 185 can control the file system management unit 183 to store the storage target file and the storage management information in the HDD 170, when the integral storage confirmation command is input through the first input unit 110.

The CPU 185 can control the file system management unit 183 to store the storage target file in the HDD 170, and to store the storage management information in NVRAM 181, respectively, when the request signal for separate storage is input through the first interface unit 150.

The CPU 185 can control the file system management unit 183 to store the storage target file and the storage management information in the HDD 170, when the request signal for integral storage is input through the first input unit 150.

According to the embodiment illustrated in FIG. 1, the host apparatus 200 has a second input unit 210, a second display unit 220, a second volatile memory 230, a second non-volatile memory 240, a printer driver 250, a second interface unit 260, and a second control unit 270.

Various user commands may be input through the second input unit 210. A keyboard and/or a mouse may be used as the second input unit 210. A signal corresponding to a user command input through the second input unit 210 may be provided to the second control unit 270, and the second control unit 270 can control the host apparatus 200 according to the signal corresponding to the input user command.

According to the present embodiment, the storage command to store the storage target file, the separate storage confirmation command, and the integral storage confirmation command may be input through the second input unit 210.

The second control unit 270 can control the second display unit 220 to display a message corresponding to the user command or various types of user notice messages.

The separate storage confirmation message of the storage management information can be displayed on the second display unit 220. The separate storage confirmation message of the storage management information may be provided on a menu screen to set printing options of the printer driver 250, and may also be provided to a second control program of the host apparatus 200.

The second volatile memory 230 can temporarily store data generated during various operations of the host apparatus 200.

The second non-volatile memory 240 can store the second control program to control overall operation of the host apparatus 200. The printer driver 250 may be software to convert a printing target document into a printing target data which can be recognized and printed by the printer 100. The printer driver 250 can provide the menu screen for printing options (e.g. a graphic user interface) to set various types of printing options according to various preferences. The printer driver 250 can be stored in the non-volatile memory 240. The printer driver 250 can convert the printing target document into the printing target data, when a printing command for the printing target document is input.

On the other hand, the storage command to store the storage target file, the separate storage confirmation command, and the integral storage confirmation command may be input through the menu screen for the printing options of the printer driver 250.

The second interface unit 260 can enable communication between the host apparatus 200 and the printer 100. The second interface unit 260 can be a wired connection or a wireless connection.

The second control unit 270 can control the overall operation of the host apparatus 200 according to the second control program stored in the second non-volatile memory 240.

The second control unit 270 can generate the request signal for separate storage, and can control the request signal for the separate storage and the storage target file to be transmitted to the printer 100, when the separate storage confirmation command is input through the second input unit 210.

The second control unit 270 can generate the request signal for integral storage, and can enable the integral storage confirmation command and the storage target file to be transmitted to the printer 100, when the integral storage confirmation command is input through the second input unit 210.

Figure 2:
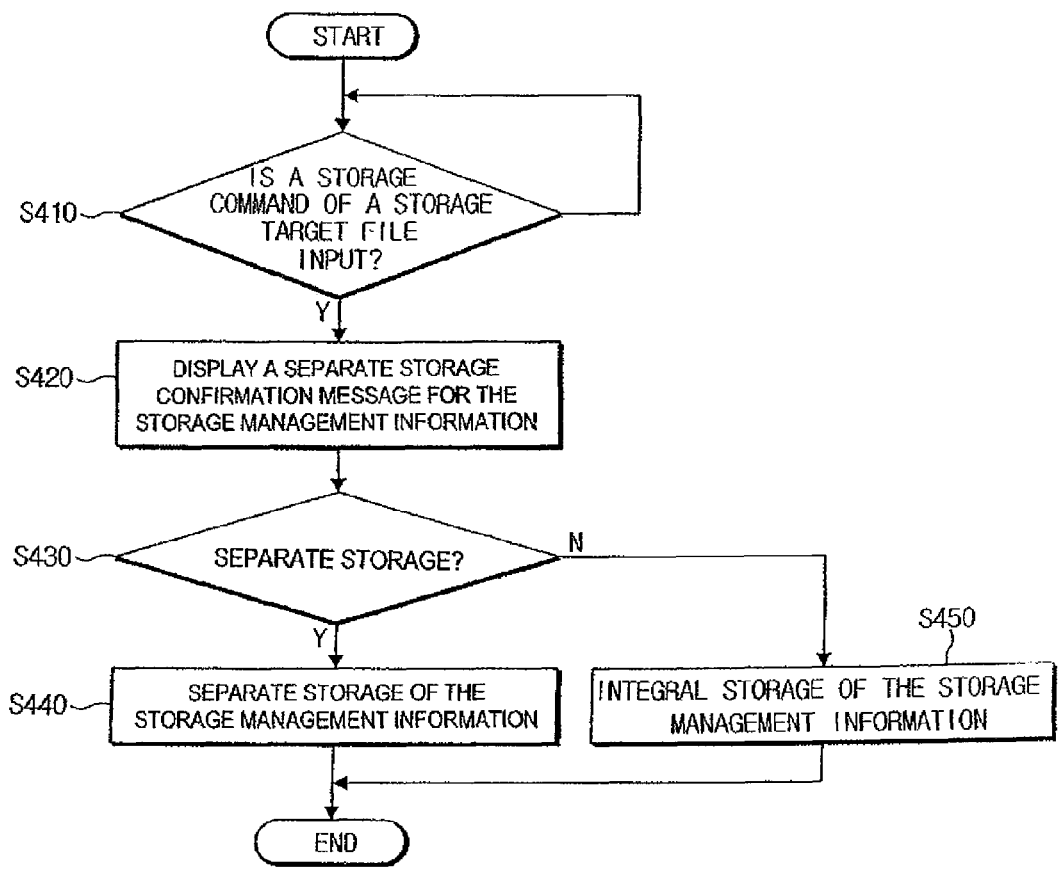
FIG. 2 is a flowchart illustrating a storage method of a storage target file according to an embodiment of the present general inventive concept.

FIG. 2 is a flowchart illustrating a storage method of a storage target file according to an embodiment of the present general inventive concept. The method of FIG. 2 can be performed by the printer 100 and the host apparatus 200 illustrated in FIG. 1. Accordingly, for illustration purposes, the method of FIG. 2 is described below with reference to FIGS. 1 and 2.

Referring to FIG. 1 and FIG. 2, when the storage command to store the storage target file is input through the first input unit 110 of the printer 100 (operation S410), the CPU 185 controls the first display unit 120 to display the separate storage confirmation message of the storage management information (operation S420).

Further, if the separate storage is confirmed, the separate storage confirmation command is input through the first input unit 110 (operation S430), and the CPU 185 controls the file system management unit 183 to store the storage target file in the HDD 170, and to store the storage management information of the storage target file in NVRAM 181, respectively, (operation S440).

On the other hand, if the separate storage is not confirmed, the integral storage confirmation command is input through the first input unit 110 (operation S430), and the CPU 185 controls the system management unit 183 to store the storage target file and the storage management information in the HDD 170 according to the predetermined file system (operation S450).

Figure 3:
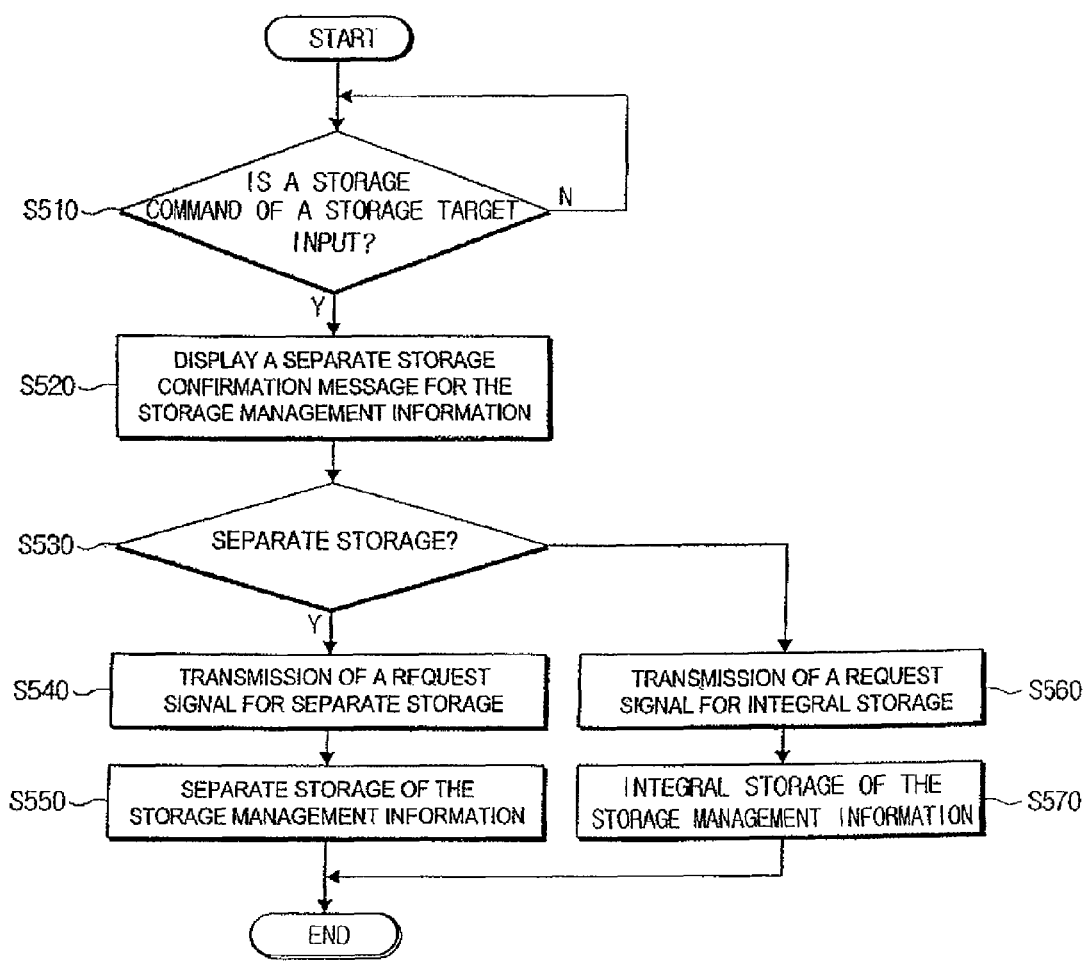
FIG. 3 is a flowchart illustrating a storage method of a storage target file according to another embodiment of the present general inventive concept.

FIG. 3 is a flowchart illustrating a storage method of a storage target file according to another embodiment of the present general inventive concept. The method of FIG. 3 may be performed by the printer 100 and the host apparatus 200 illustrated in FIG. 1. Accordingly, for illustration purposes, the method of FIG. 3 is described below with reference to FIGS. 1 and 3.

Referring to FIG. 1 and FIG. 3, when the storage command to store the storage target file is input through the second input unit 210 (operation S510), the second control unit 270 controls the second display unit 220 to display the separate storage confirmation message of the storage management information (operation S520).

Further, if the separate storage is confirmed, the separate storage confirmation command is input through the second input unit 210 (operation S530), and the second control unit 270 controls the storage target file and the request signal for separate storage to be transmitted to the printer 100 (operation S540). Further, the request signal for separate storage is provided to the CPU 185, and the CPU 185 controls the file system management unit 183 to store the storage target file in the HDD 170, and the storage management information of the storage target file in the NVRAM 181, separately.

When the integral storage confirmation command is input through the second input unit 210, the second control unit 270 controls the storage target file and the request signal for integral storage to be transmitted to the printer 100 (operation S530). Further, the request signal for integral storage is provided to the CPU 185, and the CPU 185 controls the file system management unit 183 to store both the storage target file and the storage management information corresponding to the storage target file in the HDD 170, separately according to a predetermined file system (operation S570).

As described above, the various embodiments of the present general inventive concept provide an image forming apparatus, and a control method thereof, in which it is possible to maintain security of various files stored in a mass storage medium, regardless of physically removing the mass storage medium, by storing a storage target file in the mass storage medium, and storing a storage management information corresponding to the storage target file in a printing controller. That is, even when the mass storage medium is moved by detaching it from the image forming apparatus, the storage management information remains stored in the image forming apparatus. Therefore, the storage target file can not be accessed since the storage management information is not available in the moved mass storage medium.

Further, according to the various embodiments of the present inventive concept, a file access time of various types of files stored in the mass storage medium may be reduced by storing the storage management information corresponding to the storage target file in a non-volatile memory of the printing controller, which can be easily accessed by a CPU.

Further, a user can choose whether to store the storage management information of the storage target file separately from the storage target file or together in the mass storage medium, depending on the security requirements of the storage target file.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:
1. An image forming apparatus, comprising:
a plurality of data storage units; and
a controller to control storage of a target file in a first data storage unit of the plurality of data storage units, and to control storage of management information corresponding to the target file in one of the plurality of data storage units according to a security class of the target file,
wherein the first data storage unit is a detachable mass storage medium and one of the plurality of data storage units which store the management information is a fixed non-volatile memory, and wherein if the target file is associated with a low security class, the storage management information is stored in the first data storage unit, and if the target file is associated with a high security class, the storage management information is stored in one of the plurality of data storage units other than the first data storage unit.

2. The image forming apparatus as claimed in claim 1, further comprising:
a user interface to enable a user to select one of the low security class and the high security class to be associated with the target file.

3. The image forming apparatus as claimed in claim 1, further comprising:
a display unit to display a menu enabling a user to select one of the low security class and the high security class to be associated to the target file.

4. The image forming apparatus as claimed in claim 1, wherein the image forming apparatus is connectable to at least one external data processing apparatus, and receives the target file from the at least one external data processing apparatus.

5. The image forming apparatus as claimed in claim 4, wherein the image forming apparatus receives a signal from the at least one external data processing apparatus indicating whether the target file has the low security class or the high security class.

6. The image forming apparatus as claimed in claim 1, wherein the controller comprises:
a file management unit to manage the plurality of data storage units.

7. The image forming apparatus as claimed in claim 1, wherein the first data storage unit is detachable from the image forming apparatus.

8. The image forming apparatus as claimed in claim 1, wherein the first data storage unit is a HDD.

9. The image forming apparatus as claimed in claim 1, wherein the first data storage unit is a USB memory connected to the image forming apparatus through a USB interface.

10. The image forming apparatus as claimed in claim 1, wherein the storage management information corresponding to the target file is stored in a non-volatile data storage unit of the plurality of data storage units.

\* \* \* \* \*